US010825289B2

(12) United States Patent
Laster

(10) Patent No.: US 10,825,289 B2
(45) Date of Patent: Nov. 3, 2020

(54) CONTROLLING AUDIO CONTENT LAYERS PLAYED ON A BANK OF ELECTRONIC GAMING MACHINES

(71) Applicant: IGT, Las Vegas, NV (US)

(72) Inventor: Kevin Laster, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/217,973

(22) Filed: Dec. 12, 2018

(65) Prior Publication Data

US 2020/0193768 A1 Jun. 18, 2020

(51) Int. Cl.
*G06F 17/00* (2019.01)
*G07F 17/32* (2006.01)

(52) U.S. Cl.
CPC ...... *G07F 17/3223* (2013.01); *G07F 17/3209* (2013.01); *G07F 17/3211* (2013.01); *G07F 17/3227* (2013.01); *G07F 17/3274* (2013.01)

(58) Field of Classification Search
None
See application file for complete search history.

(56) References Cited

U.S. PATENT DOCUMENTS 7,208,669 B2 * 4/2007 Wells ...................... A63F 13/12 84/601
8,758,111 B2 * 6/2014 Lutnick ............... G07F 17/3232 463/16
8,904,421 B2 * 12/2014 Scott ...................... G06Q 10/00 725/24
2004/0005923 A1 * 1/2004 Allard ..................... A63F 13/10 463/35
2005/0124411 A1 * 6/2005 Schneider .......... G06Q 30/0209 463/29
2006/0166741 A1 * 7/2006 Boyd ...................... G07F 17/32 463/42
2007/0155494 A1 * 7/2007 Wells ...................... A63F 13/12 463/35
2008/0113698 A1 * 5/2008 Egozy ..................... A63F 13/12 463/7
2010/0048302 A1 * 2/2010 Lutnick ............... G07F 17/3286 463/42
2012/0115608 A1 * 5/2012 Pfeifer ................ G07F 17/3225 463/35

(Continued)

*Primary Examiner* — Paul A D'Agostino
(74) *Attorney, Agent, or Firm* — Sage Patent Group

(57) ABSTRACT

A system comprising a communication interface, a processing circuit, and a memory device that stores machine readable instructions that, when executed by the processing circuit, cause the processing circuit to identify audio content that comprises multiple audio content layers. Each audio content layer of the plurality of audio content layers being playable to generate a portion of sound that is generated when playing the audio content. The processing circuit determines a quantity of active electronic gaming machines ("EGMs") in a bank of EGMs, determines a portion of the audio content layers based on the quantity of active EGMs, and generates audio instructions for an active EGM in the bank of EGMs. The audio instructions can indicate that the portion of the audio content layers are selectable to be played by the active EGM. The processing circuit transmits, via the communication interface, the audio instructions to the active EGM.

20 Claims, 8 Drawing Sheets

(56) References Cited

U.S. PATENT DOCUMENTS

| | | | | |
|---|---|---|---|---|
| 2013/0178271 | A1* | 7/2013 | Aponte | G07F 17/34 463/20 |
| 2014/0024450 | A1* | 1/2014 | Ramachandran | A63F 13/10 463/31 |
| 2014/0057719 | A1* | 2/2014 | Decker | G07F 17/3211 463/35 |

* cited by examiner

CONTROLLING AUDIO CONTENT LAYERS PLAYED ON A BANK OF ELECTRONIC GAMING MACHINES

BACKGROUND

Embodiments described herein relate to systems, devices, and methods for controlling a bank of electronic gaming machines, and in particular for controlling audio content layers played on a bank of electronic gaming machines.

Electronic and electro-mechanical gaming machines ("EGMs") are systems that allow users to place a wager on the outcome of a random event, such as the spinning of mechanical or virtual reels or wheels, the playing of virtual cards, the rolling of mechanical or virtual dice, the random placement of tiles on a screen, etc. The outcomes of such events are purely random or pseudo-random, and indeed, the requirement for randomness or pseudo-randomness of the outcomes is regulated in many jurisdictions.

Gambling on these systems may be contrasted with some other types of gambling, such as blackjack and poker, in which a player may increase their chance of winning a wager by playing the game with some level of skill relative to other players. Even in those games, however, a player cannot readily overcome the inherent randomness and odds of the game regardless of the player's skill.

There are many EGMs that are competing for players. As such, EGM manufacturers are actively seeking different ways to attract players and to generate repeat play on specific games and/or games from specific manufacturers.

BRIEF SUMMARY

According to some embodiments, a system is provided for controlling audio content layers played on a bank of electronic gaming machines. The system can include a communication interface, a processing circuit, and a memory coupled to the processing circuit. The memory can include machine readable instructions that, when executed by the processing circuit, cause the processing circuit to identify audio content. The audio content can include multiple audio content layers, and each audio content can be playable to generate a portion of sound that is generated when playing the audio content. The processing circuit can determine a quantity of active electronic gaming machines ("EGMs") in a bank of EGMs. The processing circuit can determine a portion of the audio content layers based on the quantity of active EGMs in the bank of EGMs. The processing circuit can generate audio instructions for an active EGM in the bank of EGMs. The audio instructions can indicate that the portion of the audio content layers are selectable to be played by the active EGM. The processing circuit can transmit, via the communication interface, the audio instructions to the active EGM.

According to different embodiments, another system is provided for controlling audio content layers played on a bank of electronic gaming machines. The system can include a communication interface, a processing circuit, and a memory coupled to the processing circuit. The memory can include machine readable instructions that, when executed by the processing circuit, cause the processing circuit to receive from a first active EGM in a bank of EGMs, via the communication interface, a selected audio content layer of multiple audio content layers that are part of an audio content. Each of the audio content layers can be playable by an active EGM in the bank of EGMs to generate a portion of sound that is generated by playing the audio content. The processing circuit can transmit, via the communication interface, a notification of the selected audio content layer to a second active EGM in the bank of EGMs.

According to some embodiments, an EGM in a bank of EGMs is provided. The EGM can include a speaker, a user interface, a communication interface, a processing circuit, and a memory coupled to the processing circuit. The memory can include machine readable instructions that, when executed by the processing circuit, cause the processing circuit to receive, via the communication interface, audio instructions from a remote device. The audio instructions can include an indication that a portion of multiple audio content layers are selectable to be played by the EGM. The processing circuit can display, via the user interface, a selectable list of the portion of the audio content layers. The processing circuit can detect, via the user interface, a selected audio content layer from the selectable list. The processing circuit can transmit, via the communication interface, an indication of the selected audio content layer to the remote device. The processing circuit can output, via the speaker, audio that is associated with the selected audio content layer.

DETAILED DESCRIPTION

Attracting and maintaining players to electronic gaming machines ("EGMs") can be difficult, various embodiments herein can improve player interest and retention in a specific EGM by controlling audio content layers played on a bank of EGMs. Some embodiments described herein relate to systems, devices, and methods for controlling a bank of electronic gaming machines ("EGMs"), and in particular for controlling audio content layers played on a bank of EGMs. In some embodiments, a processing circuit identifies audio content (e.g., a song) that includes multiple audio content layers (e.g., different audio tracks for different instruments or different musicians). The processing circuit can divide the audio content layers based on a quantity of active EGMs in a bank of EGMs and transmit audio instructions to each of the active EGMs that provides each of the active EGMs with a portion of the audio content layers that are playable by the active EGM.

Embodiments of the inventive concepts can allow for collaboration between different users in a bank of EGMs to produce more of the sound associated with a specific audio content. For example, a single active EGM in a bank of EGMs may be limited to only a portion of the audio content layers associated with an audio content, but multiple active EGMs in a bank of EGMs can be played to access more of the audio content layers associated with the audio content. As new audio content layers are played, notifications can be displayed identifying the new audio content layer and the user that selected the new audio content layer. Accordingly, players can gain extra satisfaction from playing the game as the players can feel like they are contributing to a group's enjoyment. Furthermore, a player may be more likely to continue playing as they feel a sense of responsibility to the group to continue providing the sound associated with their game play.

As noted above, the electronic gaming industry may seek to enhance a player's experience by developing a player's attraction to a specific game. In addition to possibly attracting new players and increasing their enjoyment of electronic wagering games, controlling audio content layers played across various EGMs in a bank of EGMs may garner brand loyalty to specific EGM manufacturers. Allowing players to build social relationships with other players may encourage players to return to the casino to build stronger social relationships and enjoy playing the EGM again. In this manner, overall player adoption and loyalty to an EGM may be increased to ultimately, increase the total amount wagered by players on the game.

Figure 1:
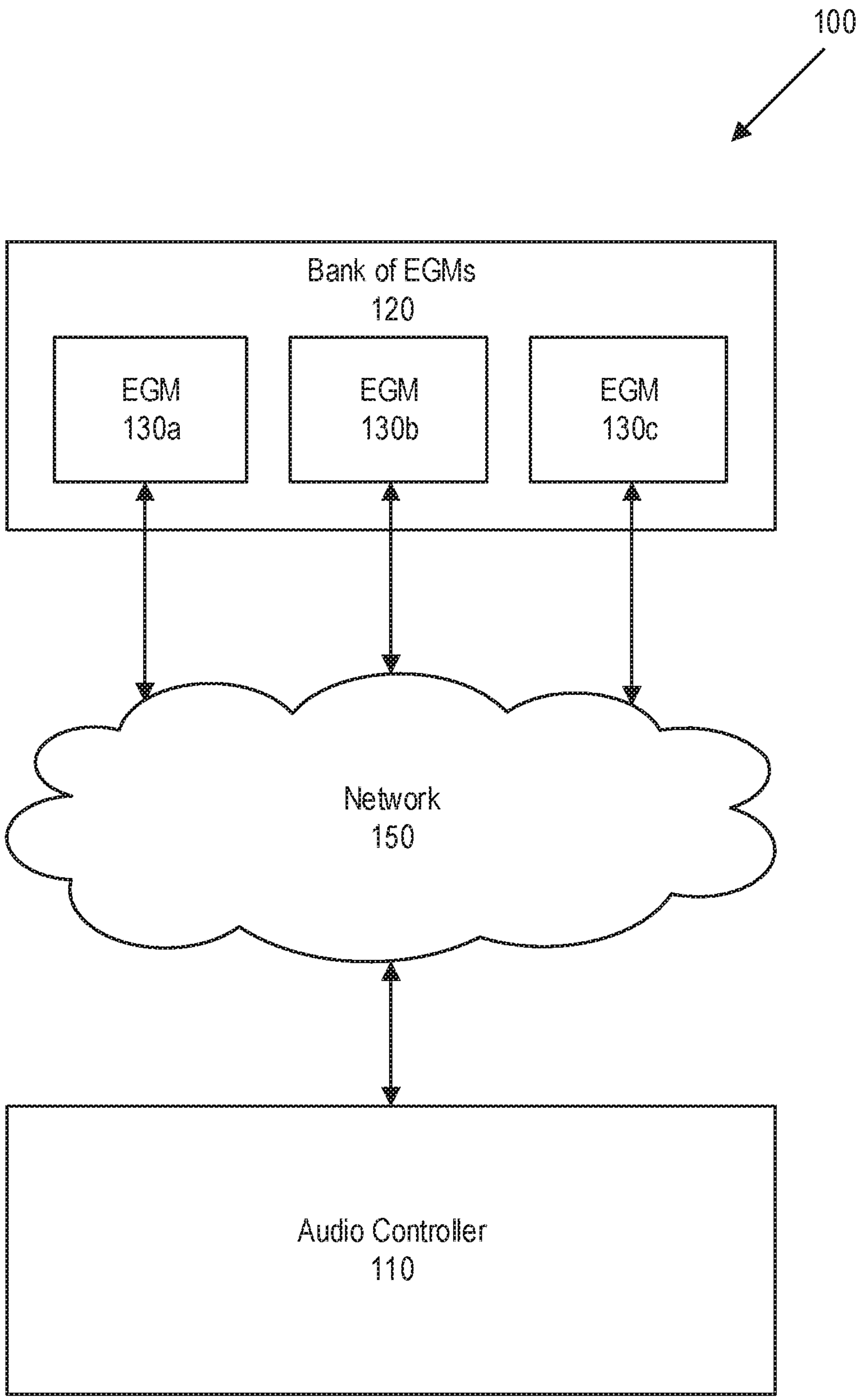
FIG. 1 is a schematic block diagram illustrating an example of a system for controlling audio content layers played on a bank of electronic gaming machines ("EGMs") according to some embodiments.

FIG. 1 depicts a system 100 for controlling audio content layers played on EGMs 130*a-c* in a bank of EGMs 120. The system 100 can include an audio controller 110 communicatively coupled to each of the EGMs 130*a-c* in the bank of EGMs 120 via a network 150.

The audio controller 110 can be any suitable server or computing device that includes at least one processing circuit and at least one memory or storage device. In alternative embodiments, the audio controller 110 is a processing circuit of one of the EGMs 130*a-c*. The audio controller 110 can determine an audio content (e.g., a song) playable on the EGMs 130*a-c* and identify multiple audio content layers that form the audio content. The audio controller 110 can divide the audio content layers into groups based on the number of EGMs 130*a-c* in the bank of EGMs 120 or based on the number of active EGMs (e.g., EGMs currently being played). The audio controller 110 can transmit audio instructions to each of the EGMs 130*a-c* indicating a group of audio content layers that are playable by each of the EGMs 130*a-c*. In some embodiments, the groups may be unique such that each of the EGMs 130*a-c* receives a group of audio content layers including at least one audio content layer that is not present in a group that is provided to another of the EGMs 130*a-c*. Accordingly, the audio controller 110 can control the audio content layers that each of the EGMs 130*a-c* in the bank of EGMs 120 is able to play.

In some embodiments, the network 150 can be a private data communication network that is operated, for example, by a gaming facility (e.g., a casino) that operates the bank of EGMs 120. Communications over the network 150 may be encrypted for security. In additional or alternative embodiments, the network 150 can be a telecommunications network.

The bank of EGMs 120 can be a group of EGMs 130*a-c* within a casino environment that share a common theme or a common game. In some embodiments, the EGMs 130*a-c* can be physically adjacent or within a threshold proximity such that audio output of one of the EGMs 130*a-c* can be heard by a player at another one of the EGMs 130*a-c* in the bank of EGMs 120. In additional or alternative embodiments, the EGMs 130*a-c* can be physically separated and communicatively coupled to allow players on physically separated EGMs 130*a-c* to interact with each other. Examples and further descriptions of EGMs 130*a-c* are provided in FIGS. 3-6.

In the depicted embodiment, each of the EGMs 130*a-c* is designed to transmit and receive events, messages, commands or any other suitable data or signal between each of the EGMs 130*a-c* and the audio controller 110. The EGMs 130*a-c* are operable to execute such communicated events, messages, or commands in conjunction with the operation of the EGMs 130*a-c*. Moreover, the audio controller 110 is designed to transmit and receive events, messages, commands or any other suitable data or signal between the audio controller 110 and each of the individual EGMs 130*a-c*. The audio controller 110 is operable to execute such communicated events, messages or commands in conjunction with the operation of the audio controller 110. It should be appreciated that one, more, or each of the functions of the audio controller 110 as disclosed herein may be performed by one or more of the EGMs 130*a-c*. It should be further appreciated that one, more, or each of the functions of one or more EGMs 130*a-c* as disclosed herein may be performed by the audio controller 110.

Figure 2:
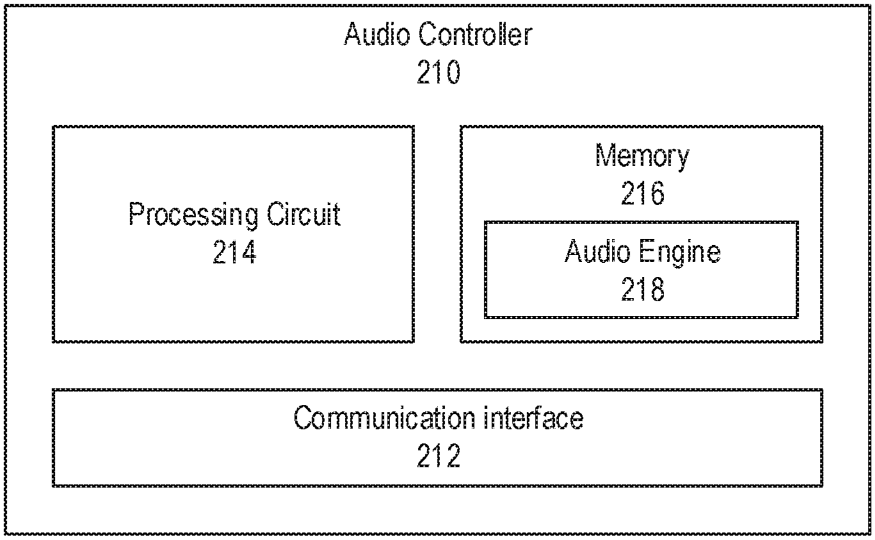
FIG. 2 is a schematic block diagram illustrating an example of an audio controller for controlling audio content layers played on a bank of EGMs according to some embodiments.

FIG. 2 depicts an audio controller 210 that can control audio content layers playable on EGMs in a bank of EGMs. The audio controller 210 includes a communication interface 212, processing circuit 214, and memory 216.

The processing circuit 214 may include one or more data processing circuits, such as a general purpose and/or special purpose processor (e.g., microprocessor and/or digital signal processor) that may be collocated within the audio controller 210 or distributed across one or more networks. The processing circuit 214 is configured to execute computer program code, for example audio engine 218, in the memory 216, described below as computer readable medium, to perform at least some of the operations described herein as being performed by the audio controller 210 or any component thereof. The communication interface 212 may be a wired network interface transceiver, e.g., Ethernet, and/or a wireless radio frequency transceiver that is configured to operate according to one or more communication protocols, e.g., WiFi, Bluetooth, cellular, LTE, etc.

The processing circuit 214 can identify audio content that includes multiple audio content layers. The processing circuit 214 can further generate audio instructions for each EGM in a bank of EGMs. The audio instructions can indicate a portion of the audio content layers that can be played by a specific EGM. In some embodiments, the audio instructions can limit the audio content layers that are playable by different EGMs in a bank of EGMs such that one EGM can play audio content layers that are not available to another EGM in the bank of EGM. The audio portions of the audio content layers can be determined based on the quantity or number of active EGMs (e.g., EGMs being played) in the bank of EGM. The audio controller 210 can transmit, via the communication interface 212, the audio instructions to each EGM in the bank of EGMs.

In some embodiments, the audio controller 210 can be an example of the audio controller 110 in FIG. 1 and the communication interface 212 can be communicatively coupled to the EGMs 130*a-c* in a bank of EGMs 120. In additional or alternative embodiments, the audio controller 210 can be included in an EGM in a bank of EGMs. The processing circuit 214 can be for executing program code to control playable audio content layers on the EGM that includes the audio controller 210 and other EGMs in the same bank of EGMs. The processing circuit 214 can further execute computer code stored in memory 216 for operating game elements of the EGM that the audio controller 210 is located. In additional or alternative embodiments, the audio controller 210 can be spread among multiple physically separate devices or EGMs.

Figure 3:
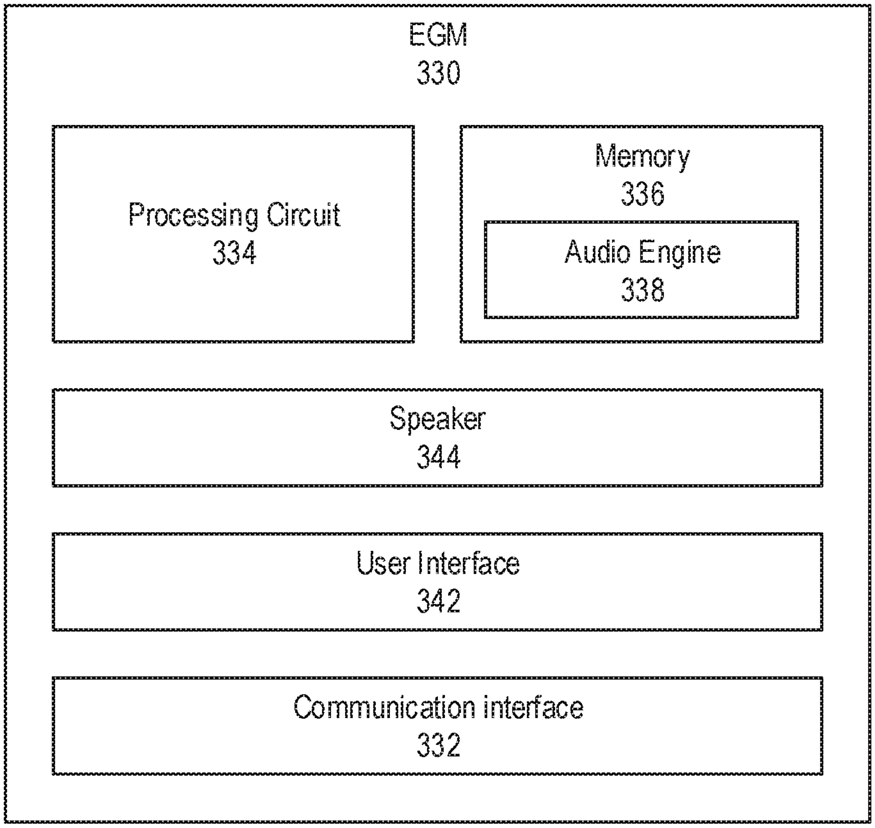
FIG. 3 is a schematic block diagram illustrating an example of an EGM for playing audio content layers according to some embodiments.
Figure 4:
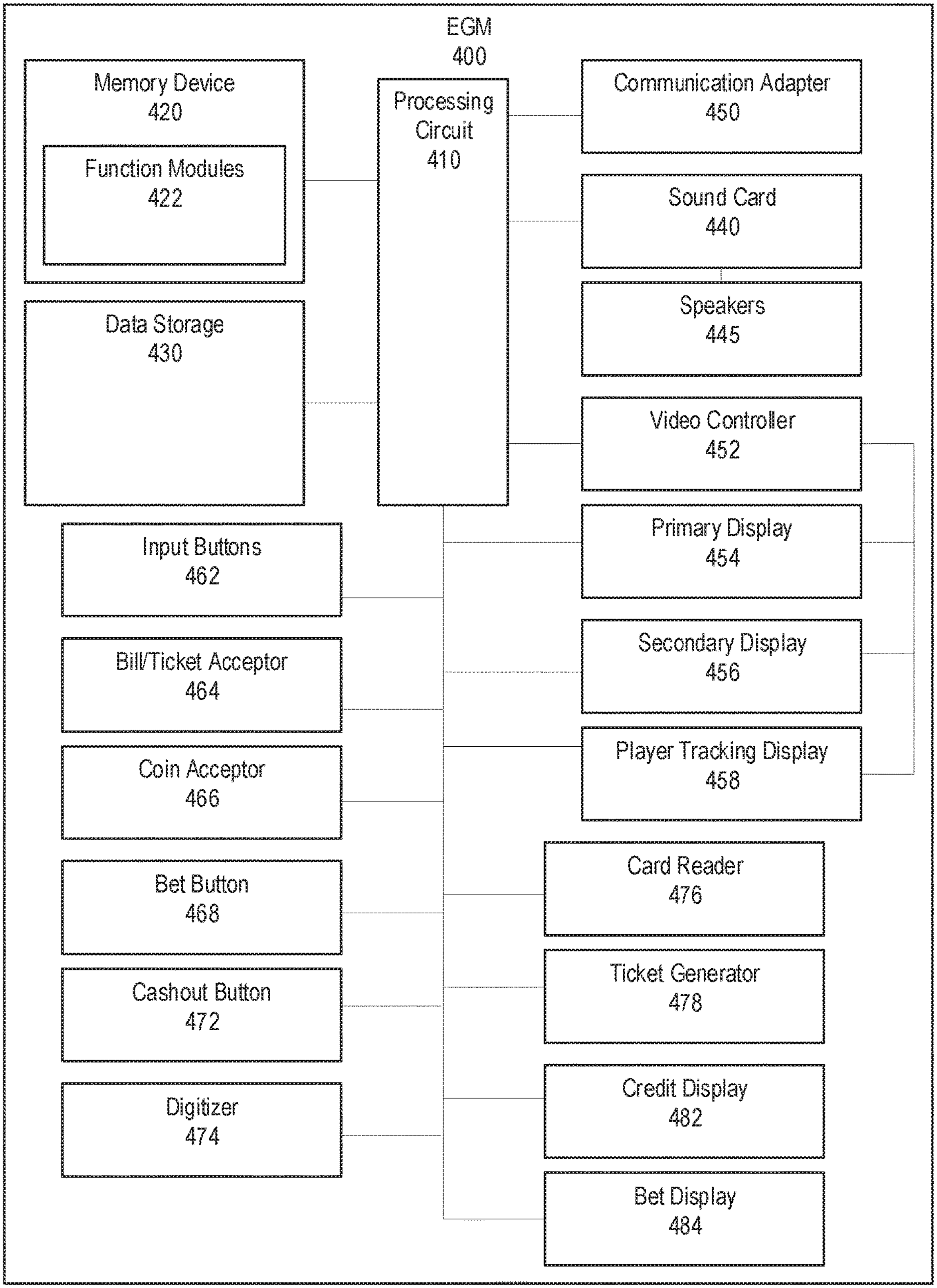
FIG. 4 is a schematic block diagram illustrating another example of an EGM for playing audio content layers according to some embodiments.
Figure 5:
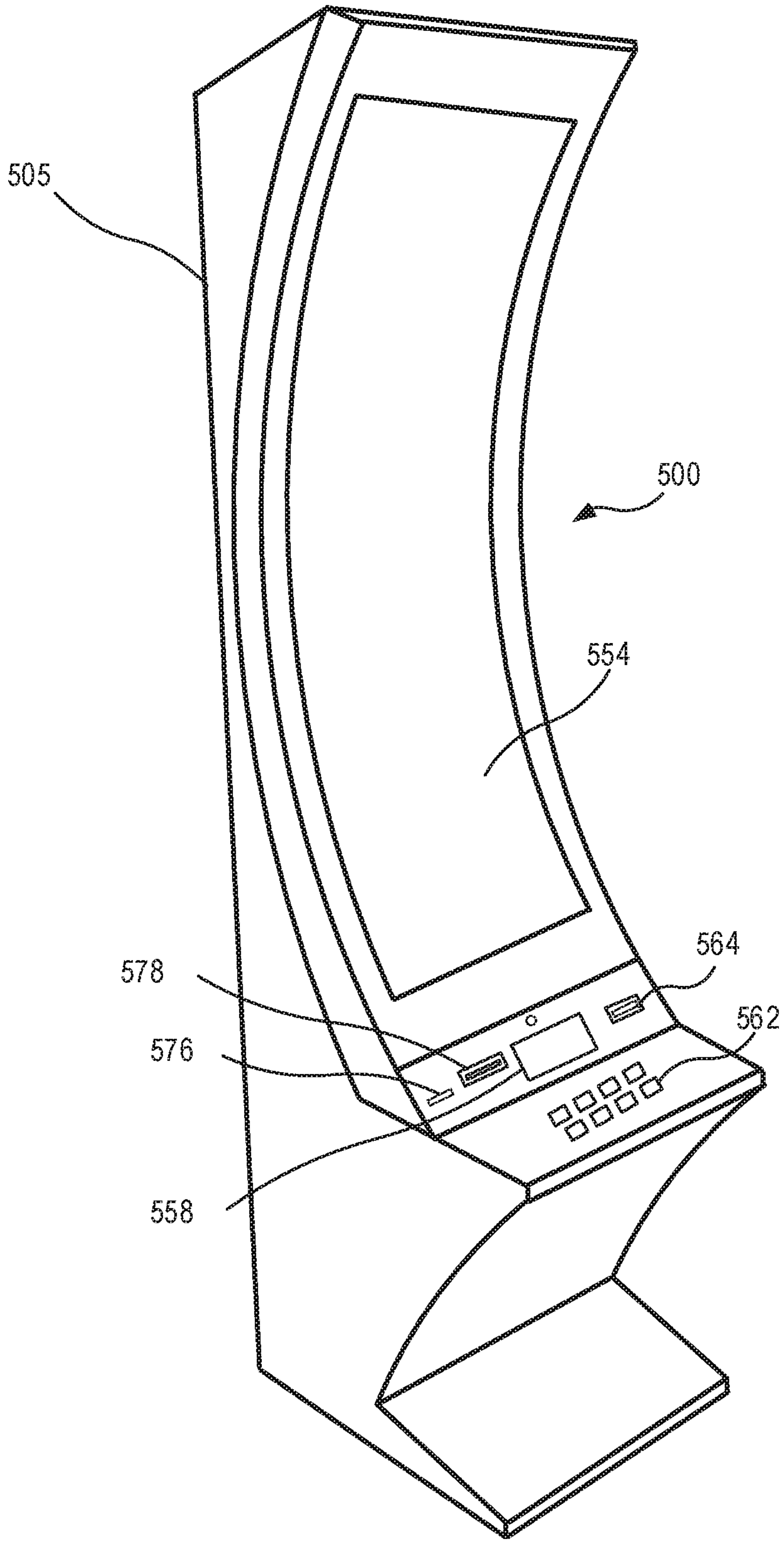
FIG. 5 is a perspective view of an example of an EGM for playing audio content layers according to some embodiments.
Figure 6:
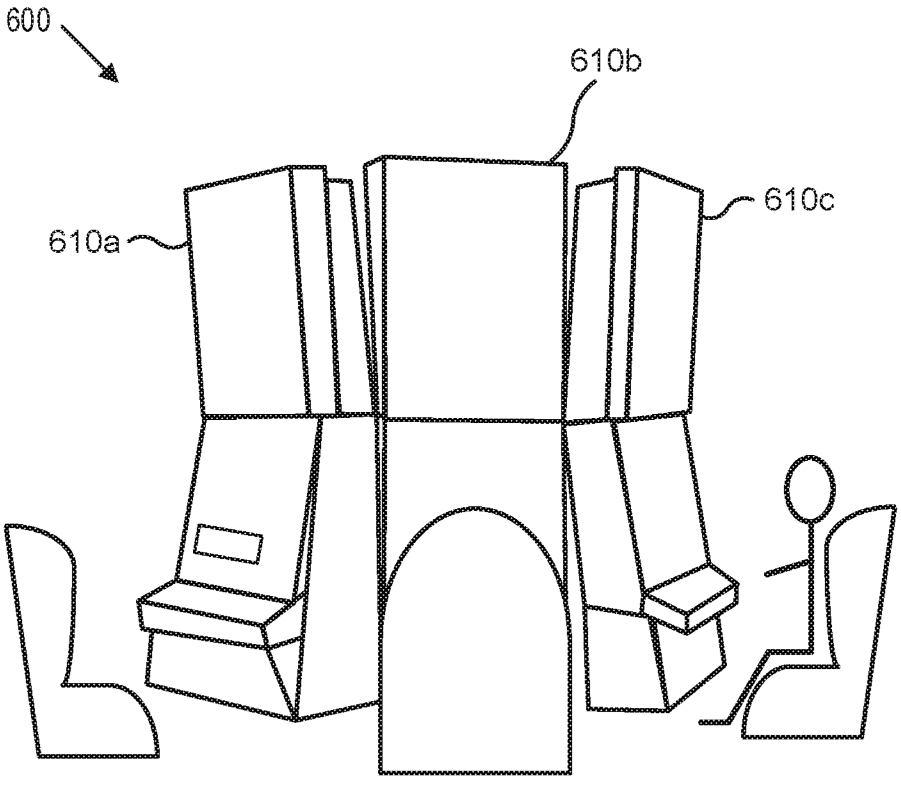
FIG. 6 is a perspective view of an example of a bank of EGMs for playing audio content layers according to some embodiments.

Examples of an EGM that can play a portion of audio content as instructed by the audio controller 210 according to various embodiments are illustrated in FIGS. 3-6. FIGS. 3-4 are block diagrams that schematically illustrate an electronic relationship of various elements of an EGM. FIGS. 5-6 are perspective views of an EGM and a bank of EGMs respectively, which illustrate various physical features of an EGM. The embodiments shown in FIGS. 3-6 are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

FIG. 3 depicts an EGM 330 that can play audio content layers indicated by an audio controller. The EGM 330 includes a communication interface 332, processing circuit 334, memory 336, user interface 342, and a speaker 344.

The processing circuit 334 may include one or more data processing circuits, such as a general purpose and/or special purpose processor (e.g., microprocessor and/or digital signal processor) that may be collocated within the EGM 330 or distributed across one or more networks. The processing circuit 334 is configured to execute computer program code, for example audio engine 338, in the memory 336, described below as computer readable medium, to perform at least some of the operations described herein as being performed by the EGM 330 or any component thereof. The communication interface 332 may be a wired network interface transceiver, e.g., Ethernet, and/or a wireless radio frequency transceiver that is configured to operate according to one or more communication protocols, e.g., WiFi, Bluetooth, cellular, LTE, etc.

The user interface 342 can include any suitable input and output devices for communicating a selectable list of audio content layers to a player and receiving a selection of an audio content layer from the selectable list. In some embodiments, the user interface 342 can be a display that is also used for displaying the game to the player. In some examples, the selectable list of audio content layers can be displayed in a pop-up window, in a settings menu, or at the start of a game. In additional or alternative embodiments, the user interface 342 can be a dedicated display for displaying the audio content layers and notifications when audio content layers are selected on the EGM 330 and on other EGMs within the same bank of EGMs as EGM 330.

In some embodiments, the processing circuit 334 can receive the audio content layers from a remote device (e.g., the audio controller 210) via the communication interface 332. In response to detecting a selected audio content layer, the processing circuit 334 can transmit, via the communication interface 332 an indication of the selection to the remote device. The processing circuit 334 can output sound associated with the selected audio content layer via the speaker 344.

FIG. 4 is a block diagram that illustrates logical and functional relationships between various components of an EGM 400. As shown in FIG. 4, the EGM 400 may include a processing circuit 410, memory device 420, data storage device 430, sound card 440, speakers 445, communication adapter 450, video controller 452, primary display 454, secondary display 456, player tracking display 458, input buttons 462, bill/ticket acceptor 464, coin acceptor 466, bet button 468, cashout button 472, digitizer 474, card reader 476, ticket generator 478, credit display 482, and a bet display 484.

The processing circuit 410 is illustrated as a single processing circuit, but multiple special purpose and/or general purpose processing circuits, processors and/or processor cores may be provided in the EGM 400. For example, the EGM 400 may include one or more of a video processor, a signal processor, a sound processor and/or a communication controller that performs one or more control functions within the EGM 400. The processing circuit 410 may be variously referred to as a "controller," "microcontroller," "microprocessor" or simply a "computer." The processing circuit may further include one or more application-specific integrated circuits ("ASICs").

Various components of the EGM 400 are illustrated in FIG. 4 as being connected to the processing circuit 410. It will be appreciated that the components may be connected to the processing circuit 410 through a system bus, a communication bus and controller, such as a USB controller and USB bus, a network interface, or any other suitable type of connection.

The memory device 420 can store one or more functional modules 422, which can be executed by the processing circuit 410 to perform various operations described herein. The memory device 420 may also store other data such as image data, event data, player input data, random or pseudo-random number generators, pay-table data or information and applicable game rules that relate to the play of the gaming device. The memory device 420 may include random access memory ("RAM"), which can include non-volatile RAM ("NVRAM"), magnetic RAM ("MRAM"), ferroelectric RAM ("FeRAM") and other forms as commonly understood in the gaming industry. In some embodiments, the memory device 420 may include read only memory ("ROM"). In some embodiments, the memory device 420 may include flash memory and/or electrically erasable programmable read only memory ("EEPROM"). Any other suitable magnetic, optical and/or semiconductor memory may operate in conjunction with the gaming device disclosed herein.

The data storage device 430 may include a hard disk drive or flash memory. The data storage device 430 may store program data, player data, audit trail data or any other type of data. The data storage device 430 may include a detachable or removable memory device, including, but not limited to, a suitable cartridge, disk, CD ROM, DVD or USB memory device. In some embodiments, the memory device 420 or the data storage device 430 can store audio files associated with audio content layers for various audio content.

The communication adapter 450 can enable the EGM 400 to communicate with remote devices over a wired and/or wireless communication network, such as a local area network ("LAN"), wide area network ("WAN"), cellular communication network, or other data communication network. The communication adapter 450 may further include circuitry for supporting short range wireless communication protocols, such as Bluetooth and/or near field communications ("NFC") that enable the EGM 400 to communicate, for example, with a mobile communication device operated by a player.

The EGM 400 may include one or more internal or external communication ports that enable the processing circuit 410 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processing circuit through a universal serial bus (USB) hub (not shown) connected to the processing circuit 410. U.S. Patent Application Publication No. 2004/0254014 describes a variety of EGMs including one or more communication ports that enable the EGMs to communicate and operate with one or more external peripherals.

The EGM 400 includes a number of displays including a primary display 454 that can be located in a central position of a cabinet of the EGM 400 and a secondary display 456 that can be located in an upper portion of the cabinet. The EGM 400 can further include a player tracking display 458, a credit display 482, and a bet display 484. The credit display 482 can display a player's current number of credits, cash, account balance, or the equivalent. The bet display 484 can display a player's amount wagered. These displays may be located anywhere on the EGM 400.

The player tracking display 458 may be used to display a service window that allows the player to interact with, for example, their player loyalty account to obtain features, bonuses, comps, etc. In other embodiments, additional display screens may be provided beyond those illustrated in FIG. 4. For example, a dedicated audio content layer display can be provided for displaying available audio content layers and selected audio content layers. In some embodiments, one or more of the player tracking display 458, the credit display 482 and the bet display 484 may be displayed in one or more portions of one or more other displays that display other game related visual content. For example, one or more of the player tracking display 458, the credit display 482 and the bet display 484 may be displayed in a picture in a picture on one or more displays.

The EGM 400 may further include a number of input buttons 462 that allow a player to provide various inputs to the EGM 400, either before, during or after a game has been played. For example, the EGM 400 may include input buttons 462 that allow the player to select options before, during or after game play. The EGM 400 may further include a game play initiation button and a cashout button 472. The cashout button 472 is utilized to receive a cash payment or any other suitable form of payment corresponding to a quantity of remaining credits of a credit display.

In some embodiments, one or more input buttons 462 of the EGM 400 are one or more game play activation devices that are each used to initiate a play of a game on the EGM 400 or a sequence of events associated with the EGM 400 following appropriate funding of the EGM 400. It should be appreciated that, in other embodiments, the EGM 400 begins game play automatically upon appropriate funding rather than upon utilization of the game play activation device.

In some embodiments, one or more input buttons 462 of the EGM 400 are one or more wagering or betting devices. One such wagering or betting device includes a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in the credit display 482 can decreases by one, and a number of credits shown in the bet display 484 can be increases by one.

In some embodiments, one or more of the display screens may be a touch-sensitive display that includes a digitizer 474 and a touchscreen controller. The player may interact with the EGM 400 by touching virtual buttons on one or more of the display devices 454, 456, 458. Accordingly, any of the above described input devices, such as the input buttons 462 and/or the cashout button 472 may be provided as virtual buttons on one or more of the display devices 454, 456, 458.

Operations of the primary display 454, the secondary display 456, and the player tracking display 458 may be controlled by a video controller 452 that receives video data from the processing circuit 410 or directly from the memory device 420 and displays the video data on the display screen. The credit display 482 and the bet display 484 can be implemented as LCD or LED displays that display a number of credits available for wagering and a number of credits being wagered on a particular game. Accordingly, the credit display 482 and the bet display 484 may be driven directly by the processing circuit 410. In some embodiments, however, the credit display 482 and/or the bet display 484 can be driven by the video controller 452.

The primary display 454, the secondary display 456, and the player tracking display 458 can include without limitation: a cathode ray tube, a plasma display, a liquid crystal display ("LCD"), a display based on light emitting diodes ("LEDs"), a display based on a plurality of organic light emitting diodes ("OLEDs"), a display based on polymer light-emitting diodes ("PLEDs"), a display based on a plurality of surface-conduction electron-emitters ("SEDs"), a display including a projected and/or reflected image, or any other suitable electronic device or display mechanism. In certain embodiments, as described above, the displays 454, 456, 458 may include a touchscreen with an associated touchscreen controller and digitizer 474. The displays 454, 456, 458 can be of any suitable size, shape, and/or configuration. The displays 454, 456, 458 may include flat or curved display surfaces.

The displays 454, 456, 458 and video controller 452 of the EGM 400 can be configured to display one or more game and/or non-game images, symbols, and indicia. IN certain embodiments, the display devices 454, 456, 458 of the EGM 400 are configured to display any suitable visual representation or exhibition of the movement of objects; dynamic lighting; video images; images of people, characters, places, things, and faces of cards; and the like. In certain embodiments, the displays 454, 456, 458 of the EGM 400 are configured to display one or more virtual reels, one or more virtual wheels, and/or one or more virtual dice. In other embodiments, certain of the displayed images, symbols, and indicia are in mechanical form. That is, in these embodiments, the displays 454, 456, 458 include any electromechanical device, such as one or more rotatable wheels, one or more reels, and/or one or more dice, configured to display at least one or a plurality of game or other suitable images, symbols, or indicia.

The EGM 400 also includes various features that enable a player to deposit credits in the EGM and withdraw credits from the EGM 400, such as in the form of a payout of winnings, credits, etc. For example, the EGM 400 may include a ticket generator 478, a bill/ticket acceptor 464, and a coin acceptor 466 that allows the player to deposit coins into the EGM 400. Some EGMs include a pair of speakers, other EGMs include additional speakers such as surround sound speakers, and still other EGMs may include built-in seating with integrated headrest speakers.

In various embodiments, the EGM 400 may generate dynamic sounds coupled with attractive multimedia images displayed on one or more of the displays 454, 456, 458 to provide an audio-visual representation or to otherwise display full-motion video with sound to attract players to the EGM 400 and/or to engage the player during gameplay. In certain embodiments, the EGM 400 may display a sequence of audio and/or visual attraction messages during idle periods to attract potential players to the EGM 400. The videos may be customized to provide any appropriate information.

The EGM 400 may further include a card reader 476 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such a cell phone, a radio frequency identification tag, or any other suitable wireless device, which communicates a player's identification, credit totals (or related data) and other relevant information to the EGM 400.

In some embodiments, money may be transferred to a gaming device through electronic funds transfer. When a player funds the gaming device, the processing circuit 410 can determine amount of funds entered and display the corresponding amount on the credit display 482.

In some embodiments, the EGM 400 may include an electronic payout device or module configured to fund an electronically recordable identification card or smart card or a bank or other account via an electronic funds transfer to or from the EGM 400.

In some embodiments, the EGM 400 may include a sensor, such as a camera in communication with the processing circuit 410 (and possibly controlled by the processing circuit 410) that is selectively positioned to acquire an image of a player actively using the EGM 400 and/or the surrounding area of the EGM 400. In one embodiment, the camera may be configured to selectively acquire still or moving (e.g., video) images and may be configured to acquire the images in either an analog, digital or other suitable format. The display devices 454, 456, 458 may be configured to display the image acquired by the camera as well as display the visible manifestation of the game in split screen or picture-in-picture fashion. For example, the camera may acquire an image of the player and the processing circuit 410 may incorporate that image into the primary and/or secondary game as a game image, symbol or indicia.

The EGM 400 may further include one or more speakers 445 controlled by one or more sound cards 440. In some embodiments, the sound cards 440 can process audio files associated with audio content layers to produce sound via speakers 445. In additional or alternative embodiments, sound cards 440 can process user input to generate user-generated audio content or user-generated audio content layers.

In some embodiments, an EGM comprises a personal device, such as a desktop computer, a laptop computer, a mobile device, a tablet computer or computing device, a personal digital assistant (PDA), or other portable computing devices. In some embodiments, the EGM may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

FIG. 5 illustrates a standalone EGM 500. In particular, the EGM 500 is characterized by having a large, high aspect ratio, curved primary display device 554 provided in the housing 505, with no secondary display device. The primary display device 554 may include a digitizer to allow touchscreen interaction with the primary display device 554. The EGM 500 may further include a player tracking display 558, a plurality of input buttons 562, a bill/ticket acceptor 564, a card reader 576, and a ticket generator 578.

FIG. 6 illustrates a bank of EGMs 600 that includes EGMs 610*a-c*. The bank of EGMs 600 can be an example of the bank of EGMs 120 in FIG. 1. In this example, EGMs 610*a-c* are physically located within a threshold proximity such that audio output by one of the EGMs 610*a-c* can be heard by a player of one of the other EGMs 610*a-c*. In some embodiments, EGM 610*c* can be considered an active EGM since EGM 610*c* has a player. EGMs 610*a-b* can be considered inactive EGMs since they do not have a player. In additional or alternative embodiments, an audio controller can divide audio content layers between the EGMs 610*a-c* based on a quantity of active EGMs in the bank of EGMs 600. In some examples, audio content can include primary audio content layers and secondary audio content layers. Primary audio content layers can be considered fundamental audio content layers. The inactive EGMs 610*a-b* may receive a group of fundamental audio content layers associated with an audio content that may be played to attract players and maintain a theme among the EGMs 610*a-c*. Secondary audio content layers can be considered additional audio content layers that may be selected by a user playing an EGM. The active EGM 610*c* may receive secondary audio content layers that form a portion of the audio content. In some examples, the active EGM 610*c* may display the received audio content layers and allow a player to select one or more audio content layers to be played by the active EGM 610*c* and/or the other EGMs 610*a-b* in the bank of EGMs 600.

Although illustrated as EGMs, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games.

Reference is now made to FIGS. 7-12, which describe operations that can be performed by an audio controller for controlling audio content layers played by EGMs in a bank of EGMs.

Figure 7:
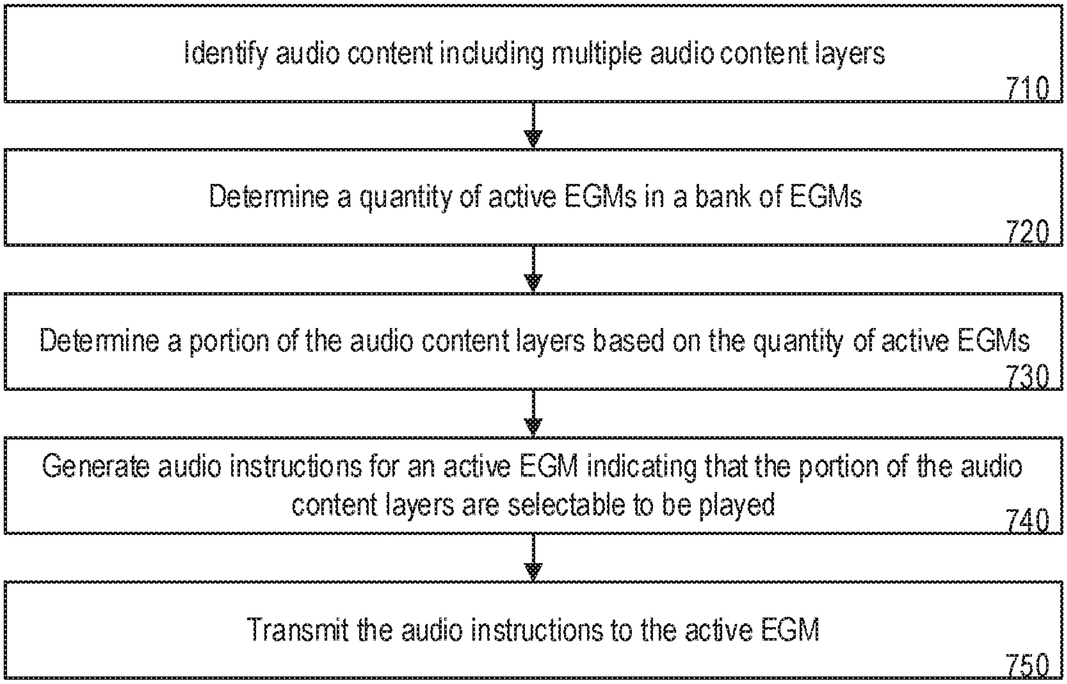
FIG. 7 is a flow diagram illustrating operations for systems and/or methods to control audio content layers playable on an EGM in a bank of EGMs according to some embodiments.

FIG. 7, which is a flow diagram illustrating operations for devices, systems and/or methods to control audio content layers played on a EGM of a bank of EGMs according to some embodiments. FIG. 7 is described below in reference to audio controller 210 in FIG. 2, but the operations can be performed in regards to any suitable device including a processing circuit in an EGM.

In block 710, processing circuit 214 identifies audio content including multiple audio content layers. Each of the audio content layers can be playable to generate a portion of the sound that is generated when playing the audio content. For example, the audio content can be a song that includes a combination of audio content layers such as different instruments, harmonies, and melodies. In some embodiments, the bank of EGMs can have a theme and identifying audio content can include selecting a song that is associated with the theme. In some examples, the audio content can be received from a central server or a database associated with the bank of EGMs. In additional or alternative examples, the audio content can be uploaded to the audio controller 210 from a user at an EGM in a bank of EGMs.

In block 720, processing circuit 214 determines a quantity of active EGMs in a bank of EGMs. The active EGMs in a bank of EGMs may be EGMs that are currently being played. The processing circuit 214 can determine the quantity of active EGMs in the bank of EGMs based on receiving, via the communication interface 212, signals from each of the active EGMs indicating an identification for a player account associated with a player on the active EGM. In some embodiments, the active EGMs can include functioning EGMs in the bank of EGMs and the processing circuit 214 can determine the quantity of active EGMs by receiving, via the communication interface 212, a signal from each active EGM in the bank of EGMs indicating the active EGM is functioning.

In block 730, processing circuit 214 determines a portion of the audio content layers based on the quantity of active EGMS. In some embodiments, the processing circuit 214 divides the audio content layers into a number of portions equal to the number of active EGMs such that each audio content layer is included in only one of the portions. In additional or alternative embodiments, the audio content layers can be sorted into tiers based on the desirability of the audio content layers and the portions can each include one audio content layer from each tier. For example, an audio content layer associated with a main vocalist singing basic lyrics and an audio content layer associated with a main guitarist playing a basic melody may be placed in a first tier, an audio content layer associated with a drum and an audio content layer associated with horns may be placed in a second tier, and an audio content layer that includes back-up vocalist and an audio content layer that includes a guitar solo may be added to a third tier. One portion can include the audio content layers associated with the main vocalist, drums, and back-up vocalist while another portion may include audio content layers associated with the main guitarist, horns, and guitar solo. In additional or alternative embodiments, all the portions may include all the audio content layers from some of the tiers and each of the portions may include a few unique audio content layers from some of the other tiers. For example, all the portions may include audio content layers associated with the main vocalist, main guitarist, drums, and horns and one portion may include audio content associated with back-up vocalist and another portion may include audio content associated with a guitar solo.

In block 740, processing circuit 214 generates audio instructions for an active EGM indicating that the portion of the audio content layers are selectable to be played. In some examples, the audio instructions may indicate that the portion of the audio content layers can be played by an active EGM in response to selecting them. In additional or alternative examples, the audio instructions may indicate the portion of audio content layers can be unlocked by a user playing on the EGM and selected to be played once unlocked. In some embodiments, the audio instructions allow a user of a first EGM to select an audio content layer to be played on the first EGM. In additional or alternative embodiments, the audio instructions allow the user of the first EGM to select audio content layers to be played on all EGMs in a bank of EGMs.

In block 750, processing circuit 214 transmits, via the communication interface 212, the audio instructions to the active EGM. In some examples, the audio instructions can include audio files associated with each of the audio content layers such that the EGM can any of the audio files to produce sound associated with one of the audio content layers in response to the audio content layer being selected.

Figure 8:
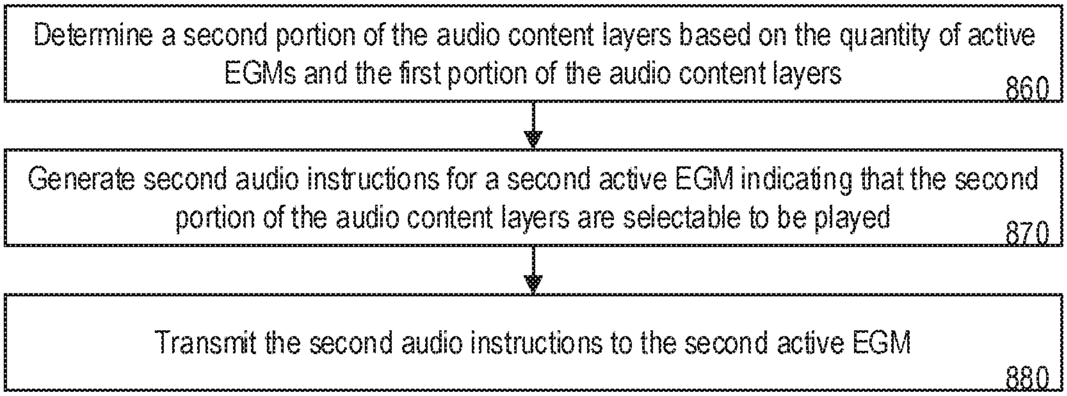
FIG. 8 is a flow diagram illustrating additional or alternative operations for devices, systems and/or methods to control audio content layers playable on an EGM in a bank of EGMs according to some embodiments.

Although FIG. 7 describes operations for controlling audio content layers that are playable on one active EGM in a bank of EGMs, the EGM may be a first active EGM of multiple active EGMs in the bank of EGMs. FIG. 8 depicts additional operations for devices, systems, and/or methods to control audio content layers played on a second active EGM of a bank of EGMs, according to some embodiments.

In block 860, processing circuit 214 determines a second portion of the audio content layers based on the quantity of active EGM and the first portion of the audio content layers. The second portion of the audio content layers can include an audio content layer that is absent from the first portion of the audio content layers.

In block 870, processing circuit 214 generates second audio instructions for a second active EGM indicating that the second portion of the audio content layers are selectable to be played. In block 880, processing circuit 214 transmits, via the communication interface 212, the second audio instructions to the second active EGM.

In some embodiments, processing circuit 214 generates timing instructions to synchronize audio output of the first active EGM and audio output of the second active EGM. The processing circuit 214 can transmit, via the communication interface 212, the timing instructions to the first active EGM and/or the second active EGM. In some examples, synchronizing the audio output of each active EGM in a bank of EGMs can cause sound produced by playing the audio content layers to be combined to form a greater portion of the audio content.

In some embodiments, processing circuit 214, receives, via the communication interface 212, a selected audio content layer from the first EGM. In response, the processing circuit 214 can transmit, via the communication interface 212, notification instructions to the second EGM. The notification instruction can include a notification that can be displayed on the second EGM identifying the selected audio content layer. In some examples, the notification can also identify the first EGM and the user that selected the audio content layer. In additional or alternative embodiments, the processing circuit 214 can transmit, via the communication interface 212, additional audio instructions to the second EGM for causing the second EGM to play the selected audio content layer.

Figure 9:
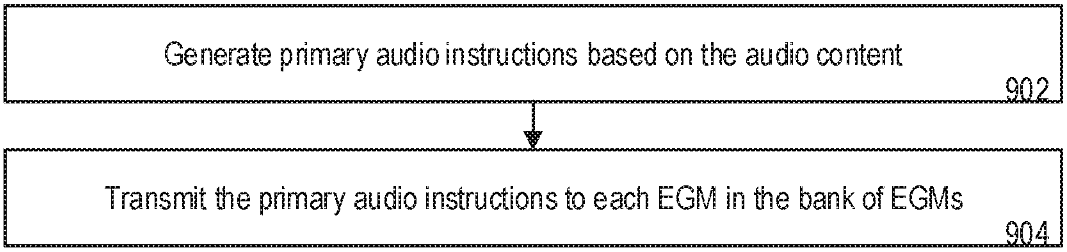
FIG. 9 is a flow diagram illustrating additional or alternative operations for systems and/or methods to control audio content layers playable on an EGM in a bank of EGMs according to some embodiments.

FIG. 9 describes additional or alternative operations for controlling audio content layers that are playable on EGMs in a bank of EGMs.

In block 902, processing circuit 214 generates primary audio instructions based on the audio content. The primary audio content layers or fundamental audio content layers may be playable to generate a fundamental portion of the sound generated when playing the audio content. In some examples, the primary audio content layers for a song can be the audio content layers necessary to identify the song or audio content layers that are most recognizable within the song. In some embodiments, the primary audio instructions can include audio files for the primary audio files and can instruct all of the EGMs in the bank of EGMs to play the audio primary audio files.

In block 904, processing circuit 214 transmits, via the communication interface, the primary audio instructions to each EGM in the bank of EGMs. The processing circuit 214 can transmit the primary audio instructions to all of the EGMs in the bank of EGMs such that the bank of EGMs produce a common or fundamental sound associated with the audio content. The primary audio content layers can be different than secondary audio content layers, which can include the selectable audio content layers provided to the active EGMs.

Figure 10:
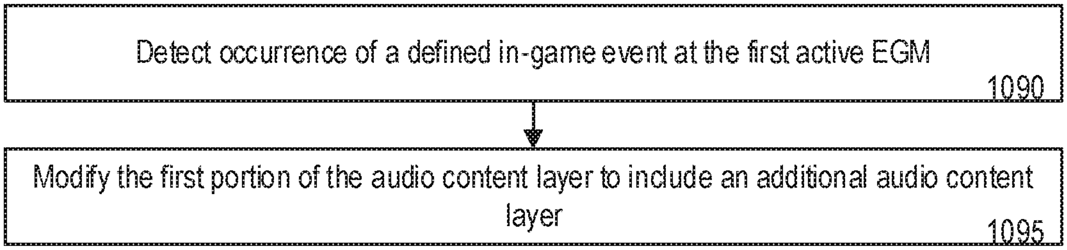
FIG. 10 is a flow diagram illustrating additional or alternative operations for devices, systems and/or methods to control audio content layers playable on an EGM in a bank of EGMs according to some embodiments.

FIG. 10 describes additional or alternative operations for controlling audio content layers that are playable on EGMs in a bank of EGMs.

In block 1090, processing circuit 214 detects an in-game event at the first active EGM. In some examples, the in-game event can be trigger by a user of the first active EGM. The in-game event can be an accomplishment by a player of the first active EGM or the in-game event can be a randomly occurring event triggered while the player is playing the first active EGM. The processing circuit 214 can detect the in-game event by receiving, via the communication interface 212, a signal from the first active EGM indicating that an in-game event has occurred and an indication of the type of in-game event that occurred.

In block 1095, processing circuit 214 modifies the first portion of the audio content layer to include an additional audio content layer. The additional audio content layer may be an audio content layer that was not previously included in the portion of the audio content layers provided to the first EGM. Accordingly, a player may unlock audio content layers to be played by the first EGM or the bank of EGMs by triggering in-game events. In some embodiments, the processing circuit 214 transmits, via the communication interface 212, a modified audio instruction to the first EGM that indicates the modified first portion of audio content layers can be selected to be played by the first EGM.

Figure 11:
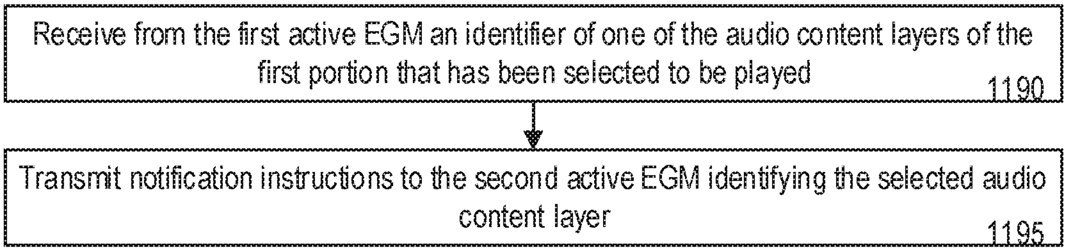
FIG. 11 is a flow diagram illustrating additional or alternative operations for systems and/or methods to control audio content layers playable on an EGM in a bank of EGMs according to some embodiments.

FIG. 11 describes additional or alternative operations for controlling audio content layers that are playable on EGMs in a bank of EGMs.

In block 1190, processing circuit 214 receive, via the communication interface 212, from the first active EGM a selected audio content layer from the first portion of audio content layers. The processing circuit 214 may receive the selected audio content layer in response to transmitting the first audio instructions to the first EGM (e.g., block 750 in FIG. 7) and a player selecting the selected audio content layer from the first portion of audio content layers.

In block 1195, processing circuit 214 transmits, via the communication interface 212, notification instructions to the second active EGM identifying the selected audio content layer. The notification instruction can include a notification that can be displayed on the second active EGM identifying the selected audio content layer. In some examples, the notification can also identify the first active EGM and the user that selected the audio content layer. Identifying the user can include displaying a name input by the user when he began playing the first active EGM or a picture captured by the first EGM. Identifying the player that selected the audio content layer can create a social relationship between the player of the first active EGM and the second active EGM. The player of the second active EGM can be impressed by the player of the first active EGMs selection and/or accomplishments and may be encouraged to keep playing in order to continue adding their selected audio content layers to the audio content layers being played by the bank of EGMs or to add additional audio content layers to the audio content layers being played by the bank of EGMs. In additional or alternative embodiments, the processing circuit 214 can transmit, via the communication interface 212, additional audio instructions to the second active EGM for causing the second EGM to play the selected audio content layer.

Figure 12:
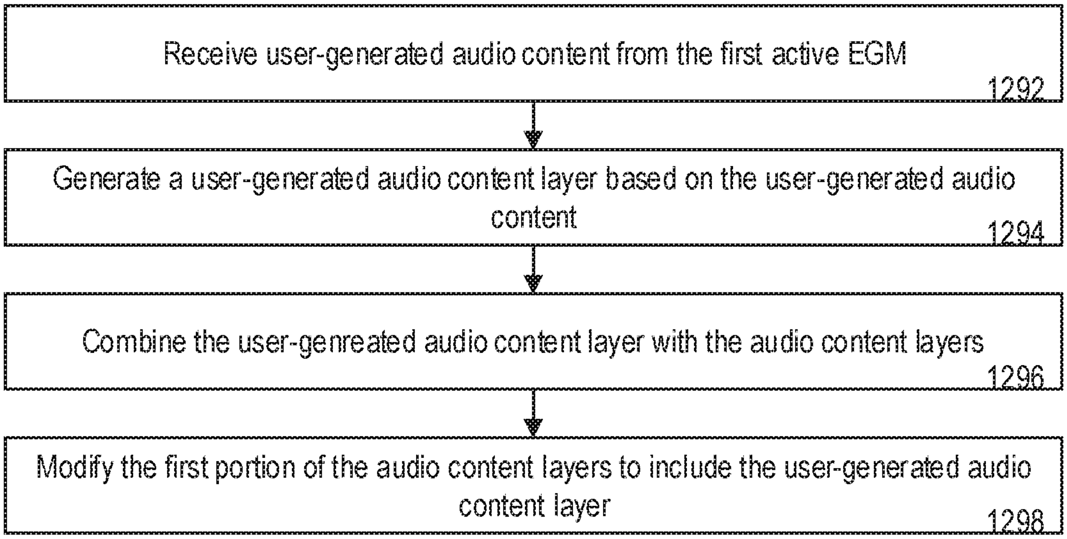
FIG. 12 is a flow diagram illustrating additional or alternative operations for devices, systems and/or methods to control audio content layers playable on an EGM in a bank of EGMs according to some embodiments.

FIG. 12 describes additional or alternative operations for controlling audio content layers that are playable on EGMs in a bank of EGMs.

In block 1292, processing circuit 214 receive, via the communication interface 212, user-generated audio content from the first active EGM. The user-generated audio content can be audio content recorded by the user at the first active EGM. In block 1294, processing circuit 214 generates a user-generated audio content layer based on the user-generated audio content. In block 1296, processing circuit 214 combine the user-generated audio content layer with the audio content layers. In some embodiments, the user-generated audio content can be received as a single audio content layer. In additional or alternative embodiments, the audio controller 210 can separate an audio content into audio content layers.

In block 1298, processing circuit 214 may modify the first portion of the audio content layers to include the user-generated audio content layers. By modifying the first portion of the audio content layers to include the user-generated audio content layer, the processing circuit 214 can instruct the first active EGM in the bank of EGMs to play the user-generated audio content. In some embodiments, the processing circuit 214 can modify audio instructions for other EGMs in the bank of EGMs to include the user-generated audio content layer as a selectable audio content layer to be played. In additional or alternative embodiments, processing circuit 214 can transmit additional audio instructions to the other EGMs in the bank of EGMs instructing the other EGMs to play the user-generated audio content layer and to display a notification indicating the user that generated the user-generated audio content.

Figure 13:
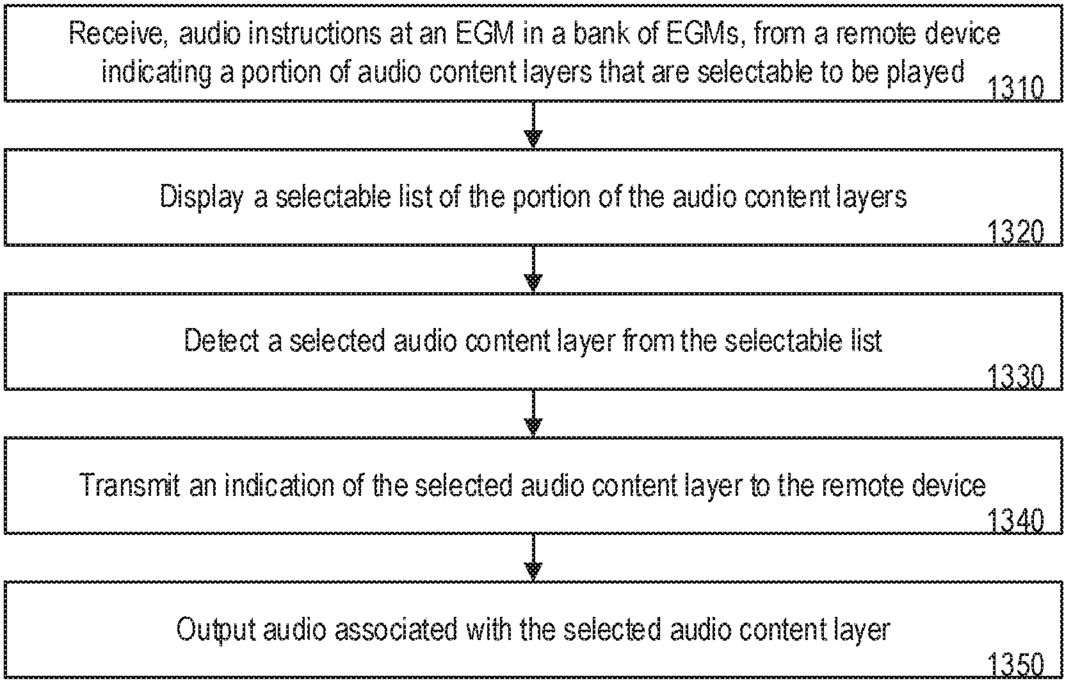
FIG. 13 is a flow diagram illustrating additional or alternative operations for systems and/or methods to control audio content layers playable on an EGM in a bank of EGMs according to some embodiments.
Figure 14:
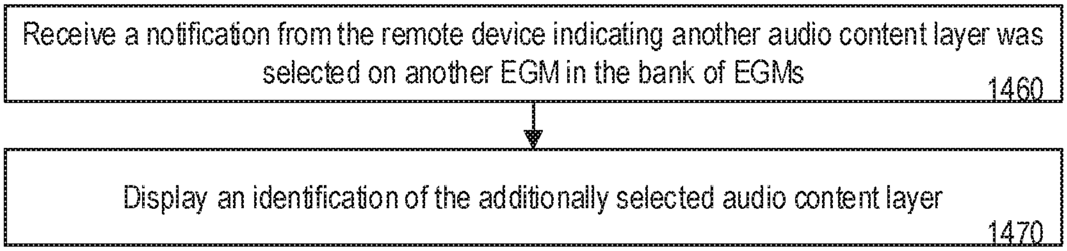
FIG. 14 is a flow diagram illustrating additional or alternative operations for devices, systems and/or methods to control audio content layers playable on an EGM in a bank of EGMs according to some embodiments.
Figure 15:
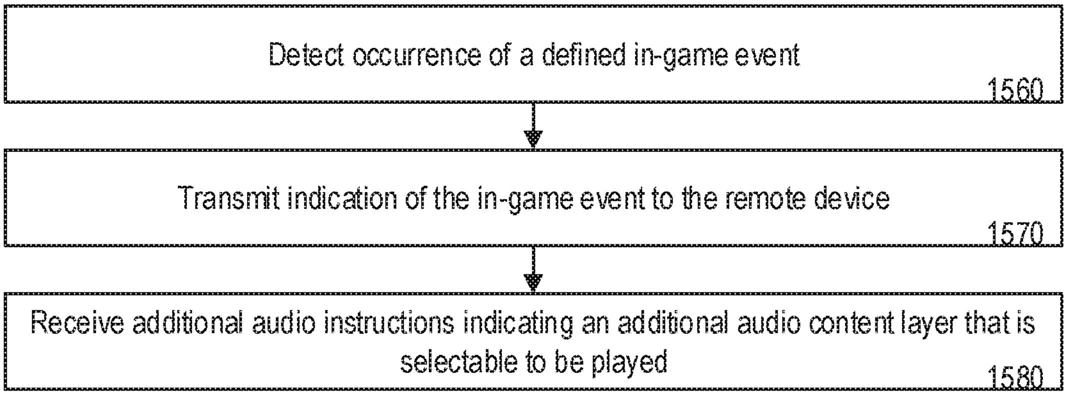
FIG. 15 is a flow diagram illustrating additional or alternative operations for systems and/or methods to control audio content layers playable on an EGM in a bank of EGMs according to some embodiments.

FIGS. 13-15 describe operations that can be performed by an EGM in a bank of EGMs as part of a system for controlling audio content layers played on EGMs in a bank of EGMs.

In block 1310, processing circuit 334 receives, via the communication interface 332, audio instructions from a remote device (e.g., the audio controller 210 in FIG. 2) indicating a portion of audio content layers that are selectable to be played. In some embodiments, the audio instructions include audio files associated with each of the audio content layers in the portion of the audio content layers. In additional or alternative embodiments, the audio instructions include audio files for each of the audio content layers that form the audio content and a list of the audio content layers that are selectable by the first active EGM.

In block 1320, processing circuit 334 displays, via the user interface 342, a selectable list of the portion of the audio content layers. In some embodiments, the processing circuit 334 can display the selectable list on a primary display at the start of a player playing the first active EGM or at predetermined times during game play. In additional or alternative embodiments, processing circuit 334 can display the selectable list on a dedicated display such that a user can make or modify a selected audio content layer during game play.

In block 1330, processing circuit 334 detects a selected audio content layer from the selectable list. In block 1340, processing circuit 334 transmits, via the communication interface 332, an indication of the selected audio content layer to the remote device. In block 1350, processing circuit 334 outputs, via the speaker 344, audio associated with the selected audio content layer.

FIG. 14 describes additional or alternative operations that can be performed by an EGM in a bank of EGMs.

In block 1460, processing circuit 334 receives, via the communication interface 332, a notification from the remote device indicating another audio content layer was selected on another EGM in the bank of EGMs.

In block 1470, processing circuit 334 displays, via the user interface 342, an identification of the additionally selected audio content layer. In some embodiments, the identification can be a pop-up that appears on a primary display of the EGM 330. In additional or alternative embodiments, the identification can appear on a dedicated display. In some embodiments, the processing circuit 334 can further display an identification of the EGM on which the selected audio content layer was selected or an identification of the user that chose the selected audio content layer.

FIG. 15 describes additional or alternative operations that can be performed by an EGM in a bank of EGMs.

In block 1560, processing circuit 334 detects that an in-game event has been triggered. An in-game event can include an achievement by a user or a randomly occurring event that has a set chance of occurring while EGM 330 is being played. In some embodiments, the in-game event can be one of a numerous in-game event options selectable by the user.

In block 1570, processing circuit 334, transmits, via the communication interface 332, indication of the in-game event to the remote device. In block 1580, processing circuit 334, receives, via the communication interface 332, additional audio instructions indicating an additional audio content layer that is selectable to be played. In some embodiments, the processing circuit 334 can display, via the user interface 342, an option to select the additional audio content layer. In additional or alternative embodiments, the additional audio content layer can be automatically played by the EGM 330, via the speakers 344.

In some embodiments, the in-game event can allow the user to record a user-generated audio content. For example, the user interface 342 of the EGM can include a physical or virtual instrument that the user can play to generate user-generated audio content. The additional audio content layer received from the remote device can include the user-generated audio content.

Embodiments described herein may be implemented in various configurations for EGMs, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processing circuit and memory devices. In such a "thick client" embodiment, the EGM local processing circuit executes the communicated computerized instructions to control any games (or other suitable interfaces) provided to a player.

In some embodiments, an EGM may be operated by a mobile device, such as a mobile telephone, tablet other mobile computing device. For example, a mobile device may be communicatively coupled to an EGM and may include a user interface that receives user inputs that are received to control the EGM. The user inputs may be received by the EGM via the mobile device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processing circuit of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Embodiments provided herein may provide improved coordination of a bank of EGMs by controlling audio content layers that are playable by different EGMs in a bank of EGMs. Such embodiments may improve the appeal of EGMs by allowing players to socially connect with other Such embodiments may improve technological efficiency by coordinating the audio content layers with examples of different types of wagering stations.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A system comprising:

a communication interface;

a processing circuit; and a memory coupled to the processing circuit, the memory comprising machine readable instructions that, when executed by the processing circuit, cause the processing circuit to:

identify audio content comprising a plurality of audio content layers, each of the audio content layers being playable to generate a portion of sound that is generated when playing the audio content;

determine, from a bank comprising a plurality of electronic gaming machines ("EGMs"), a quantity of active EGMs in the bank;

determine a portion of the plurality of audio content layers based on the quantity of the active EGMs in the bank;

generate audio instructions for a first EGM of the active EGMs in the bank, that indicate the portion of the plurality of audio content layers that are selectable via a user interface of the first EGM to be played by the first EGM; and transmit, via the communication interface, the audio instructions to the first EGM.

2. The system of claim 1, wherein the portion of the plurality of audio content layers is a first portion of the plurality of audio content layers and the audio instructions comprise first audio instructions, wherein the memory further comprises machine readable instructions that, when executed by the processing circuit, cause the processing circuit to:

determine a second portion of the plurality of audio content layers based on the quantity of the active EGMs and that is different from the first portion of the plurality of audio content layers;

generate second audio instructions for a second EGM of the active EGMs in the bank, the second audio instructions indicating that the second portion of the plurality of audio content layers are selectable to be played by the second EGM; and transmit, via the communication interface, the second audio instructions to the second EGM.

3. The system of claim 2, wherein the memory further comprises machine readable instructions that, when executed by the processing circuit, cause the processing circuit to:

generate timing instructions to synchronize audio output of the first EGM and the second EGM; and transmit, via the communication interface, the timing instructions to the first EGM and the second EGM.

4. The system of claim 2, wherein the memory further comprises machine readable instructions that, when executed by the processing circuit, cause the processing circuit to:

receive, from the first EGM via the communication interface, an identifier of one of the plurality of audio content layers in the first portion that has been selected to be played by the first EGM; and responsive to receiving the selected audio content layer of the first portion of the plurality of audio content layers, transmit, via the communication interface, notification instructions to the second EGM, the notification instructions comprising a notification that is displayable on the second EGM indicating the identifier of the one of the plurality of audio content layers in the first portion that has been selected and an identifier of the first EGM.

5. The system of claim 2, wherein the memory further comprises machine readable instructions that, when executed by the processing circuit, cause the processing circuit to:

receive, from the first EGM via the communication interface, an identifier of the plurality of audio content layers of the first portion that has been selected to be played on each of the active EGMs in the bank; and responsive to receiving the identifier of one of the plurality of audio content layers of the first portion that has been selected, transmit, via the communication interface, additional audio instructions to the second EGM requesting the second EGM play the one of the first portion of the plurality of audio content layers corresponding to the identifier in addition to any of the second portion of the plurality of audio content layers.

6. The system of claim 5, wherein the memory further comprises machine readable instructions that, when executed by the processing circuit, cause the processing circuit to transmit, to the second EGM and via the communication interface, an audio file comprising the one of the first portion of the plurality of audio content layers corresponding to the identifier.

7. The system of claim 1, wherein the memory further comprises machine readable instructions that, when executed by the processing circuit, cause the processing circuit to:

detect occurrence of a defined in-game event at the active EGM; and responsive to detecting the occurrence of the defined in-game event, modify the portion of the plurality of audio content layers to comprise an additional audio content layer of the plurality of audio content layers that was not previously in the portion of the plurality of audio content layers.

8. The system of claim 1, wherein the memory further comprises machine readable instructions that, when executed by the processing circuit, cause the processing circuit to transmit, via the communication interface, audio files that comprise the audio content layers in the portion of the plurality of audio content layers.

9. The system of claim 1, wherein the plurality of audio content layers are a plurality of secondary audio content layers and wherein the audio content comprises the secondary audio content layers and a plurality of primary audio content layers, the plurality of primary audio content layers being playable to generate a primary portion of the sound generated when playing the audio content, wherein the memory further comprises machine readable instructions that, when executed by the processing circuit, cause the processing circuit to:

generate primary audio instructions that cause the plurality of primary audio content layers to be played by an EGM; and transmit, via the communication interface, the primary audio instructions to each of the EGMs in the bank.

10. The system of claim 1, wherein the memory further comprises machine readable instructions that, when executed by the processing circuit, cause the processing circuit to:

receive, via the communication interface, user generated audio content from the first EGM;

generate a user-generated audio content layer based on the user generated audio content;

combine the user-generated audio content layer with the plurality of audio content layers; and modify the portion of the plurality of audio content layers such that the portion of the plurality of audio content layers comprises the user-generated audio content layer.

11. A system comprising:

a communication interface;

a processing circuit; and a memory coupled to the processing circuit, the memory comprising machine readable instructions that, when executed by the processing circuit, cause the processing circuit to:

receive, from a first active electronic gaming machine ("EGM") of a bank that comprises a plurality of EGMs and via the communication interface, an identifier of one of a plurality of audio content layers of an audio content that has been selected via a user interface of the first EGM, each of the audio content layers being playable to generate a portion of sound that is generated when playing the audio content; and transmit, via the communication interface, a notification of the selected audio content layer to a second active EGM in the bank.

12. The system of claim 11, wherein causing the processing circuit to transmit the notification further comprises causing the processing circuit to transmit, via the communication interface, play instructions to the second active EGM to play the selected audio content layer and timing instructions to synchronize the audio output of the second active EGM with audio output of the first active EGM.

13. The system of claim 11, wherein causing the processing circuit to transmit the notification further comprises causing the processing circuit to transmit, via the communication interface, instructions to the second active EGM to display the identifier of the selected audio content layer and an identifier of a user that is associated with the first active EGM.

14. The system of claim 11, wherein the memory further comprises machine readable instructions that, when executed by the processing circuit, cause the processing circuit to:

receive, from the first active EGM via the communication interface, indication of an occurrence of a defined in-game event on the first active EGM;

determine an additional audio content layer based on the occurrence of the defined in-game event; and transmit, via the communication interface, the additional audio content layer to the first active EGM.

15. The system of claim 11, wherein the memory further comprises machine readable instructions that, when executed by the processing circuit, cause the processing circuit to:

receive, via the communication interface, a user-generated audio content layer from the first active EGM; and transmit, to the second active EGM via the communication interface, the user-generated audio content layer.

16. The system of claim 11, wherein the plurality of EGMs comprise a common theme, and wherein the audio content comprises a song that is associated with the common theme.

17. The system of claim 11, wherein the memory further comprises machine readable instructions that, when executed by the processing circuit, cause the processing circuit to:

determine a quantity of active EGMs in the bank;

determine a plurality of portions of a plurality of audio content layers in the audio content based on the quantity of the active EGMs in the bank;

generate audio instructions for each active EGM that indicate a unique portion of the plurality of portions of the audio content layers that are selectable to be played by each respective active EGM;

transmit, via the communication interface, each of the audio instructions to each corresponding active EGM, and receive the identifier of the one of the plurality of audio content layers that has been selected in response to causing the processing circuit to transmit each of the audio instructions to the corresponding active EGM, the one of the plurality of audio content layers that has been selected being one of the audio content layers in the unique portion of the plurality of portions of the audio content layers that are selectable.

18. An electronic gaming machine ("EGM") in a bank that comprises a plurality of EGMs, the EGM comprising:

a speaker;

a user interface;

a communication interface;

a processing circuit; and a memory coupled to the processing circuit, the memory comprising machine readable instructions that, when executed by the processing circuit, cause the processing circuit to:

receive, via the communication interface, audio instructions from a remote device that indicate a portion of a plurality of audio content layers of an audio content that are selectable to be played by the EGM, each of the audio content layers being playable to generate a portion of sound that is generated when playing the audio content;

display, via the user interface, a selectable list of the portion of the plurality of audio content layers;

receive, via the user interface, an input that selects a selected audio content layer from the selectable list of the portion of the plurality of audio content layers;

transmit, via the communication interface, an indication of the selected audio content layer to the remote device; and output, via the speaker, audio that is associated with the selected audio content layer.

19. The EGM of claim 18, wherein the memory further comprises machine readable instructions that, when executed by the processing circuit, cause the processing circuit to:

receive, via the communication interface, a notification from the remote device indicating that an additional audio content layer has been selected at a different EGM in the bank; and responsive to receiving the notification, display, via the user interface, the notification comprising identification of the additional selected audio content layer and identification of the different EGM in the bank.

20. The EGM of claim 18, wherein the memory further comprises machine readable instructions that, when executed by the processing circuit, cause the processing circuit to:

detect that an in-game event has occurred at the EGM;

responsive to detecting the in-game event, transmit, via the communication interface, indication of the in-game event to the remote device; and responsive to transmitting the indication, receive, via the communication interface, additional audio instructions comprising an additional audio content layer that is selectable to be played by the EGM.

* * * * *